(12) United States Patent
Gundlach et al.

(10) Patent No.: US 6,754,073 B2
(45) Date of Patent: Jun. 22, 2004

(54) THERMAL LOAD DISSIPATION ASSEMBLY

(75) Inventors: John Geoffrey Gundlach, Chapel Hill, NC (US); Dean Frederick Herring, Youngsville, NC (US); Paul Andrew Wormsbecher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/134,013

(22) Filed: Apr. 26, 2002

(65) Prior Publication Data

US 2003/0202324 A1 Oct. 30, 2003

(51) Int. Cl.[7] ............................................. G06F 1/16
(52) U.S. Cl. ..................... 361/687; 361/724; 454/184; 312/223.2
(58) Field of Search ............................. 361/687, 695, 361/724, 725; 454/184–186; 312/223.1, 223.2

(56) References Cited

U.S. PATENT DOCUMENTS

| | | | | |
|---|---|---|---|---|
| 5,603,376 A | * | 2/1997 | Hendrix | 165/104.34 |
| 5,825,620 A | * | 10/1998 | Chrysler et al. | 361/695 |
| 6,164,369 A | * | 12/2000 | Stoller | 165/104.33 |
| 6,234,240 B1 | * | 5/2001 | Cheon | 165/80.3 |
| 6,384,325 B1 | * | 5/2002 | Chastain et al. | 174/35 R |
| 6,392,901 B1 | * | 5/2002 | Colver et al. | 361/826 |
| 6,454,646 B1 | * | 9/2002 | Helgenberg et al. | 454/184 |
| 6,466,438 B1 | * | 10/2002 | Lim | 361/687 |
| 6,504,719 B2 | * | 1/2003 | Konstad et al. | 361/698 |

* cited by examiner

*Primary Examiner*—Darren Schuberg
*Assistant Examiner*—Anthony Q. Edwards
(74) *Attorney, Agent, or Firm*—Lally & Lally

(57) ABSTRACT

An assembly for dissipating heat generated by electronic components, the assembly designed to include a computer chassis dimensioned to substantially enclose the electronic components. The assembly is further designed so that the chassis includes a panel having a substantially flat portion and a non-flat portion with the non-flat portion including a plurality of vent holes and having a surface area that is greater than the surface area of a flat portion with corresponding outer dimensions so as to permit an increase in the number of vent holes and improvement in the air flow within the computer chassis while at the same time maintaining the structural integrity of the computer chassis and minimizing electromagnetic interference resulting from the percentage of open area to closed area within the venting surface.

17 Claims, 4 Drawing Sheets

THERMAL LOAD DISSIPATION ASSEMBLY

BACKGROUND

1. Field of the Present Invention

The present invention generally relates to dissipating heat generated by electronic components, and more specifically to an assembly for promoting the efficient dissipation of heat in a computer.

2. History of Related Art

Market demands for processing intensive applications such as multimedia have resulted in an ever increasing demand for computing systems that operate at higher speeds. In addition, market preferences generally dictate that smaller system packages are preferred to larger system packages. Typically, computer systems are cooled by one or more fans mounted to the interior of the chassis that blow air across the applicable electronic components and transfer heat through convection.

The trend towards smaller packages for the computer systems while at the same time increasing the available computing power of the systems has increased the amount of heat generated within the systems, and thus, increased the importance of effective and reliable cooling. Moreover, in the recent past, typically only the central processor of a computing system generated enough heat to warrant extensive heat dissipation consideration. Since then, however, the higher operating speeds demanded of components peripheral to the central processor have resulted in the need to address the dissipation of thermal loads from components other than just the central processing unit. For example, many computing systems include one or more peripheral interfaces that comply with various industry standard bus architectures such as the Industry Standard Architecture (ISA), Extended Industry Standard Architecture (EISA), or Peripheral Component Interface (PCI). These standards may require bus frequencies in excess of 100 MHz thereby creating significant thermal energy within the confined space of the computer system.

Failure to provide adequate cooling can result in the loss of valuable computing resources as well as the expenditure of increased resources to recover lost data. Thus, achieving marketplace success dictates that manufacturers design increasingly efficient mechanisms and systems for dissipating heat within a computer system without significantly increasing cost, complexity, or package size. Therefore, it would be desirable to implement a heat dissipation assembly for a computer system that increased the amount of air flow without bigger fans, bigger boxes, or the like.

SUMMARY OF THE INVENTION

The problems identified above are in large part addressed by an assembly for dissipating heat within a computer system wherein the assembly is designed to permit an increase in the available area for venting (and thereby increasing ambient air flow within the computer system) without compromising the structural integrity of the assembly and at the same time maintaining the ability of the assembly to adequately shield electromagnetic interference that may be generated by electronic components located within the computer system.

Briefly and in general terms, the present invention according to one embodiment thereof contemplates an assembly for dissipating heat generated by electronic components, the assembly designed to include a computer chassis dimensioned to substantially enclose the electronic components. The assembly is further designed so that the chassis includes a panel having a substantially flat portion and a non-flat portion with the non-flat portion including a plurality of vent holes and having a surface area that is greater than the surface area of a flat portion with corresponding outer dimensions.

Other aspects and advantages of the present invention will become apparent from the following detailed description when taken in conjunction with the accompanying drawings, illustrating by way of example the principles of the present invention.

BRIEF DESCRIPTION OF THE DRAWINGS

Other objects and advantages of the invention will become apparent upon reading the following detailed description and upon reference to the accompanying drawings in which.

Figure 1:
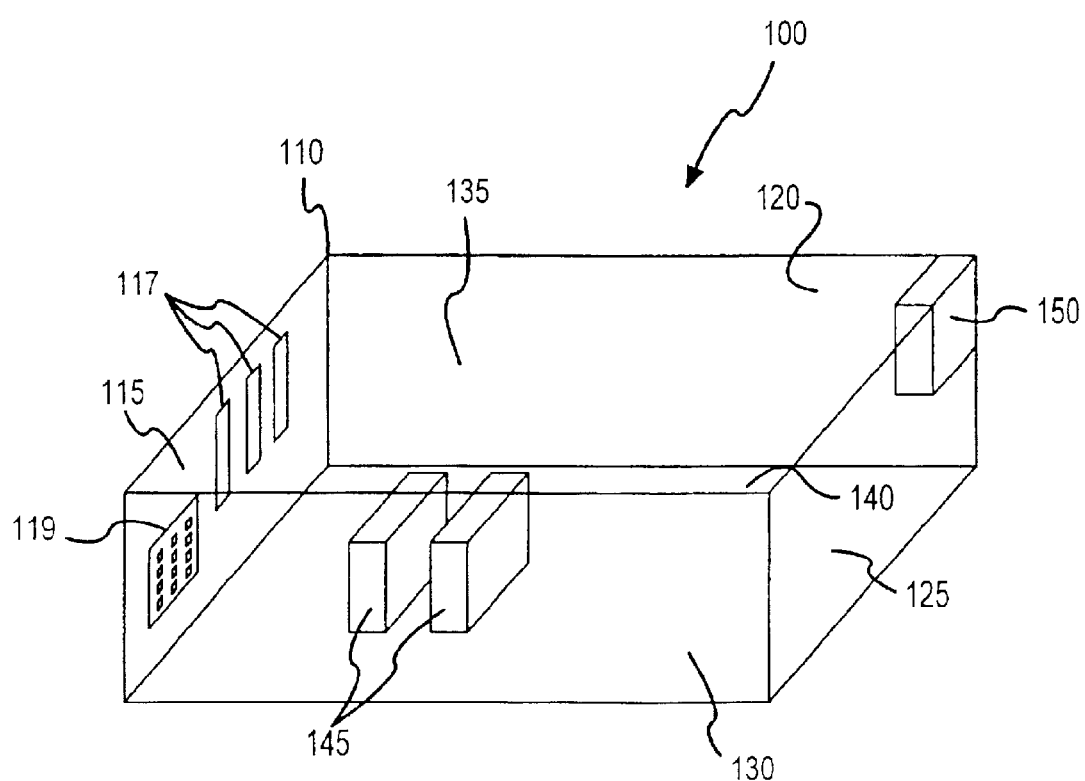
FIG. 1 is a perspective view of a computer system according to the present-day art.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed. On the contrary, the invention is limited only by the claim language.

DETAILED DESCRIPTION OF THE INVENTION

As shown in the drawings for purposes of illustration, the present invention contemplates an assembly for dissipating heat generated by electronic components, the assembly designed to include a computer chassis dimensioned to substantially enclose the electronic components. The assembly is further designed so that the chassis includes a panel having a substantially flat portion and a non-flat portion with the non-flat portion including a plurality of vent holes and having a surface area that is greater than the surface area of a flat portion with corresponding outer dimensions. Throughout the description and the drawings, elements which are the same will be accorded the same reference numerals.

Turning now to the drawings, FIG. 1 depicts a perspective view of select components of a computer system 100 according to the present-day art. Computer system 100 includes chassis 110. Chassis 110 includes side panels 115, 120, 125, and 130, top panel 135, and bottom panel 140. Side panels 115, 120, 125, and 130, top panel 135, and bottom panel 140 are all substantially flat.

Computer system 100 includes one or more heat generating electronic components 145 and fan 150 located inside chassis 110. Side panel 115 includes slots 117 which are selectively designed and sized to accommodate and permit access to various I/O ports, adapter cards, power connections, electronic components, and the like which may be mounted inside chassis 110. Side panel 115 also includes vent holes 119 to facilitate the movement of ambient air within chassis 110 by fan 150 in order to dissipate heat created by electronic components 145 and other heat producing components that may be located within chassis 110.

Figure 2:
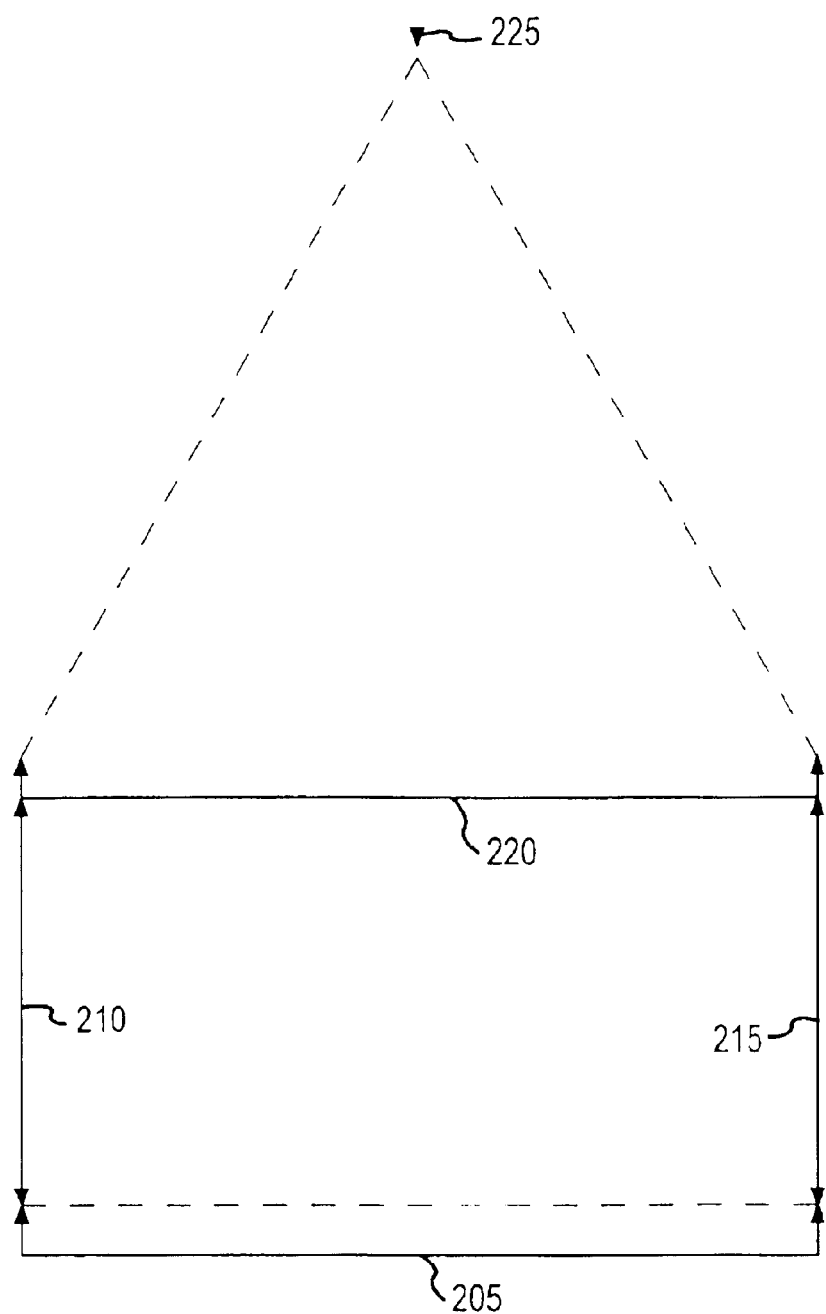
FIG. 2 illustrates the resulting increase in surface area available for improving thermal load dissipation according to one embodiment of the present invention.

Turning to FIG. 2, an advantage of the present invention is illustrated. Typically, the issue in computer systems represented by the present-day art is establishing sufficient venting area to permit adequate air flow within the computer system while at the same time minimizing electromagnetic interference resulting from the percentage of open area to closed area within the defined venting surface. Venting surface 205 is a one-dimensional depiction of a typical one-to-one correlation between open and closed areas located between points 210 and 215 of typical venting surface 205 contained in the present-day art. The result of such one-to-one correlation is the typical availability of approximately fifty percent (50%) of the applicable venting surface 205 being available for venting holes.

In one embodiment of the present invention, the issues of increasing available air flow in a defined venting surface while at the same time maintaining an acceptable correlation between open and closed areas so as to address structural integrity and electromagnetic issues is in large part addressed by selectively increasing the available surface area of the venting surface portion. As depicted, the available surface area for venting surface 220 is twice that of venting surface 205 without increasing the distance between points 210 and 215 or increasing the one-to-one correlation between open and closed areas. This result is a one hundred percent (100%) increase in surface area for venting surface 220 due to the fact that distance between points 210 and 225 for venting surface 220 equals the distance between points 210 and 215 for venting surface 205 and likewise the distance between points 225 and 215 for venting surface 220 equals the distance between points 210 and 215 for venting surface 205.

Figure 3:
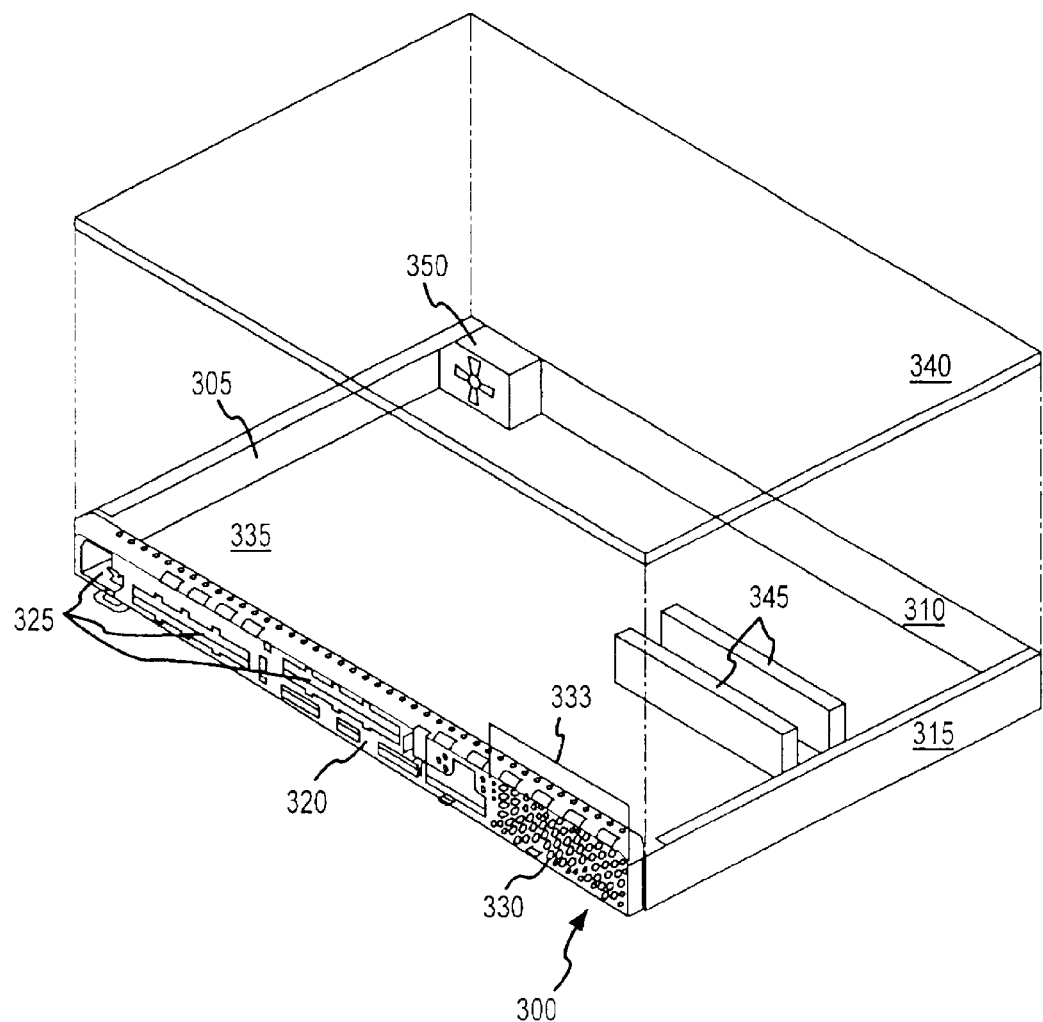
FIG. 3 is a perspective view of an assembly for dissipating heat according to one embodiment of the present invention.

Turning to FIG. 3, selected features of computer system according to one embodiment of the invention are shown. In the depicted embodiment, computer system 300 includes side panels 305 and 315, front panel 310, rear panel 320, bottom panel 335, and top panel 340; with bottom panel 335 and top panel 340 being connected to side panels 305 and 315, front panel 310, and rear panel 320.

Computer system 300 includes one or more heat generating electronic components 345 and fan 350. Rear panel 320 includes slots 325 which are selectively designed and sized to accommodate and permit access to various I/O ports, adapter cards, power connections, electronic components, and the like which are mounted inside computer system 300. Rear panel 320 also includes a plurality of vent holes 330 located within venting surface 333 of rear panel 320 to facilitate the movement of ambient air within computer system 300 by fan 350.

As depicted in the present embodiment, venting surface 333 is curved so as to increase the surface area within venting surface 333, and thereby, correspondingly increasing the number of vent holes 330, the size of vent holes 330, or a combination of both number and size of vent holes 330, and thus, improving the air flow within computer system 300 while at the same time maintaining the structural integrity of rear panel 320 and minimizing electromagnetic interference resulting from the percentage of open area to closed area within venting surface 333. It will be appreciated that with respect to rear panel 320, while venting surface 333 is non-flat, the remainder of rear panel 320 is substantially flat so as to facilitate the accommodation of various I/O ports, adapter cards, power connections, electronic components, and the like which are mounted inside computer system 300 and accessed via slots 325. It will be apparent to those skilled in the art that while venting surface 333 is depicted on rear panel 320, venting surface 333 could be located on any of the side panels 305 or 315, front panel 310, bottom panel 335, or top panel 340.

Figure 4:
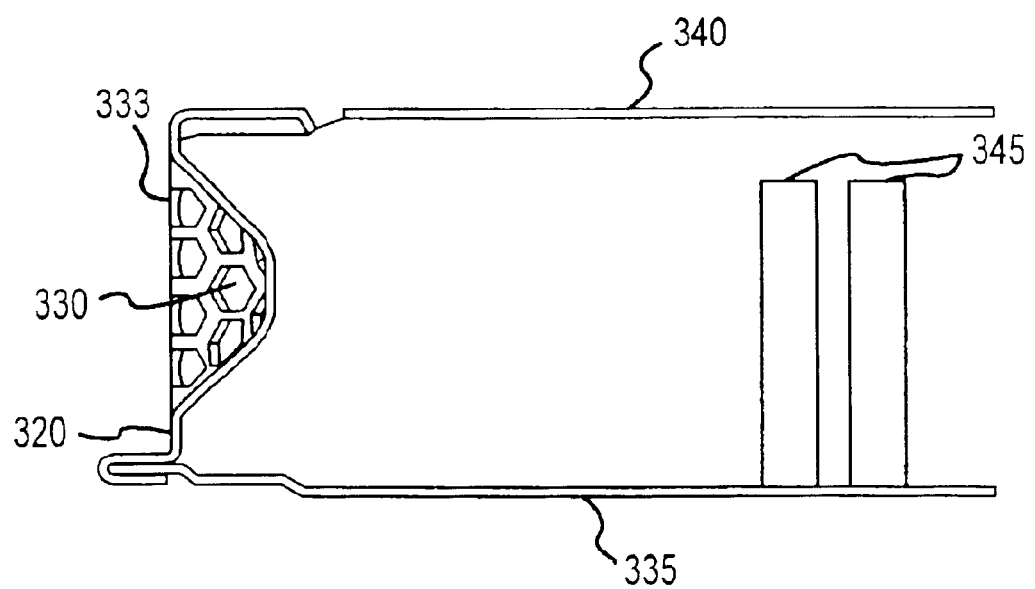
FIG. 4 depicts a cross sectional view of the venting portion of the assembly for dissipating heat depicted in FIG. 3.

Turning to FIG. 4, a cross sectional view of the venting surface 333 of rear panel 320 is depicted. While the venting holes can be circular, oval, square, rectangular, or any other shape, the shape of the venting holes 330 (in the present embodiment) is preferably hexagonal. It will be appreciated that with suitable design modification, the venting holes can assume a shape or combination of shapes.

It will be apparent to those skilled in the art having the benefit of this disclosure that the present invention contemplates an assembly for dissipating heat generated by electronic components, the assembly designed to include a computer chassis dimensioned to substantially enclose the electronic components. The assembly is further designed so that the chassis includes a panel having a substantially flat portion and a non-flat portion with the non-flat portion including a plurality of vent holes and having a surface area that is greater than the surface area of a flat portion with corresponding outer dimensions so as to permit an increase in the number of vent holes and improvement in the air flow within the computer chassis while at the same time maintaining the structural integrity of the computer chassis and minimizing electromagnetic interference resulting from the percentage of open area to closed area within the venting surface. It is understood that the forms of the invention shown and described in the detailed description and the drawings are to be taken merely as presently preferred examples and that the invention is limited only by the language of the claims.

What is claimed is:

1. An assembly for dissipating heat generated by electronic components comprising:

a computer chassis dimensioned to substantially enclose the electronic components;

wherein the computer chassis includes at least one panel;

wherein the at least one panel includes a curved portion;

wherein the surface area of the curved portion is greater than the surface area of a flat portion with corresponding outer dimensions; wherein the entire curved portion consists of a single curved section of at least one panel extending inward to the computer chassis and wherein the curved portion includes a plurality of vent holes.

2. The assembly of claim 1 wherein the entire curved portion of the at least one panel extends exterior to the computer chassis.

3. The assembly of claim 1 wherein the plurality of vent holes are hexagonal in shape.

4. The assembly of claim 1 wherein the at least one panel comprises a side panel.

5. The assembly of claim 1, wherein the at least one panel comprises a top panel.

6. The assembly of claim 1 wherein the at least one panel includes a substantially flat portion and further wherein the curved portion is confined to a first contiguous region of the panel and the substantially flat portion comprises the remainder of the panel.

7. The assembly of claim 6, wherein the at least one panel comprises a rear panel and wherein the substantially flat portion defines a set of slots suitable for providing external access to adapter cards within the chassis.

8. A computer chassis panel;
wherein the panel includes a curved portion within a contiguous first region of the panel;
wherein the surface area of the curved portion is greater then the surface area of a flat portion with corresponding outer dimensions; wherein the curved portion of the panel consists of a single curved section extending entirely inward to the computer chassis and
wherein the curved portion includes a plurality of vent holes.

9. The panel of claim 8 wherein the curved portion of the panel extends entirely exterior to the computer chassis.

10. The panel of claim 8 wherein the plurality of vent holes are hexagonal in shape.

11. The panel of claim 8 wherein the portion of the panel not within the first region comprises a substantially flat portion.

12. The panel of claim 11, wherein the substantially flat portion defines a set of slots suitable for receiving adapter cards.

13. A computer comprising:
a computer chassis;
at least one heat-producing electronic component mounted inside the computer chassis;
a fan mounted inside the computer chassis to direct ambient air through the computer;
wherein the computer chassis is dimensioned to substantially enclose the at least one electronic components and the fan;
wherein at least one panel of the chassis includes a curved portion defining a plurality of vent holes and wherein the curved portion of the at least one panel consists of a single curved section extending entirely inward to the computer chassis.

14. The computer of claim 13 wherein the curved portion is confined to a first contiguous region of the panel and wherein the at least one panel further includes a substantially flat portion.

15. The computer of claim 14, wherein the substantially flat portion defines a set of slots enabling access to adapters cards within the chassis.

16. The computer of claim 13 wherein the curved portion of the at least one panel extends exterior to the computer chassis.

17. The computer of claim 13 wherein the plurality of vent holes are hexagonal in shape.

* * * * *